(12) United States Patent
Zhao

(10) Patent No.: US 11,946,608 B1
(45) Date of Patent: Apr. 2, 2024

(54) ASYMMETRIC COLLIMATOR

(71) Applicant: Feng Zhao, Newburgh, NY (US)

(72) Inventor: Feng Zhao, Newburgh, NY (US)

( * ) Notice: Subject to any disclaimer, the term of this patent is extended or adjusted under 35 U.S.C. 154(b) by 0 days.

(21) Appl. No.: 17/845,974

(22) Filed: Jun. 21, 2022

Related U.S. Application Data

(60) Provisional application No. 63/212,722, filed on Jun. 21, 2021.

(51) Int. Cl.
| | | |
|---|---|---|
| *F21S 4/28* | (2016.01) | |
| *F21V 7/00* | (2006.01) | |
| *F21V 8/00* | (2006.01) | |
| *F21Y 115/10* | (2016.01) | |

(52) U.S. Cl.
CPC .............. *F21S 4/28* (2016.01); *F21V 7/0091* (2013.01); *G02B 6/0021* (2013.01); *G02B 6/0046* (2013.01); *F21Y 2115/10* (2016.08)

(58) Field of Classification Search
CPC ........ F21S 4/28; F21V 7/0091; G02B 6/0046; G02B 6/0021
See application file for complete search history.

(56) References Cited

U.S. PATENT DOCUMENTS

| | | | | |
|---|---|---|---|---|
| 7,083,313 | B2 * | 8/2006 | Smith | F21V 13/04 362/555 |
| 2010/0111515 | A1 * | 5/2010 | Saitoh | G02B 6/0018 362/558 |
| 2010/0296283 | A1 * | 11/2010 | Taskar | F21V 5/04 362/346 |
| 2013/0120974 | A1 * | 5/2013 | Swisha | F21V 33/006 362/147 |

* cited by examiner

*Primary Examiner* — Evan P Dzierzynski
*Assistant Examiner* — Nathaniel J Lee
(74) *Attorney, Agent, or Firm* — DeWitt LLP; Brian R. Pollack, Esq.

(57) ABSTRACT

The present disclosure is generally directed to lighting systems that enhance the distribution of light. As set forth herein, the disclosed embodiments can include a lighting device, such as a strip of light emitting diodes (LEDs) and an asymmetric total internal reflection (TIR) lens.

18 Claims, 5 Drawing Sheets

ASYMMETRIC COLLIMATOR

CROSS-REFERENCE TO RELATED APPLICATION

This patent application claims the benefit of priority to U.S. Patent Application Ser. No. 63/212,722, filed Jun. 21, 2021. The disclosure of the foregoing patent application is expressly incorporated by reference herein in its entirety for any purpose whatsoever.

BACKGROUND

LEDs are being employed to an ever greater extent for lighting applications due to their power efficiency and versatility. LEDs are employed, for example, in luminaires, which are stand-alone lighting units which may include one or more LED lamps or lanterns. Luminaires have been employed in traffic lighting, pathway lighting, and parking lot lighting, among other public uses. The present disclosure includes improvements over the current state of the art.

SUMMARY OF THE DISCLOSURE

In some implementations, the lighting system can be configured as a wall wash fixture, ceiling wash fixture, or other fixture. The lighting system can be straight, wave shaped, loop shaped, and the like, as desired.

The present disclosure further discloses methods of manufacturing an asymmetric TIR lens as set forth herein, and optionally, a lighting system including the asymmetric TIR lens. The TIR lens can be formed by injection molding, press forming into a mold, or other suitable technique, preferably as a single, monolithic element. If desired, the method can further include bending the extrusion into a desired shape in a jig or template, such as a curved template, before it fully hardens after molding or extrusion. If desired, the light transmissive material can be polymeric or glass, as desired.

The disclosure further provides implementations of methods for installing a light fixture, including providing a lighting system as set forth herein, and installing the lighting system in an orientation wherein the first elongate planar surface is oriented toward a wall to be illuminated. The second elongate planar surface can accordingly be oriented toward a location where an intended observer of the wall illumination is to be located so that the intended observer is unable to discern where light from the fixture is originating from.

It is to be understood that both the foregoing general description and the following detailed description are exemplary and are intended to provide further explanation of the embodiments disclosed herein.

The accompanying drawings, which are incorporated in and constitute part of this specification, are included to illustrate and provide a further understanding of the method and system of the disclosure. Together with the description, the drawings serve to explain the principles of the disclosed embodiments.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which.

DETAILED DESCRIPTION

The present disclosure is generally directed to lighting systems that enhance the distribution of light. As set forth below, the disclosed embodiments can include a lighting device, such as a strip of light emitting diodes (LEDs) and an asymmetric total internal reflection (TIR) lens. TTR lenses known in the art tend to be symmetric about a central axis and is typically aligned with a cylindrical coordinate system. The present disclosure includes implementations of a typically linear TIR lens that can be made, for example, by way of a polymeric extrusion that includes a first edge for placing along a light source, such as a strip of LEDs. The LEDs project light through the first edge of the TIR lens such that it is reflected internally off of a first side of the lens, and "bounced" out through an opposing face of the lens.

Figure 1:
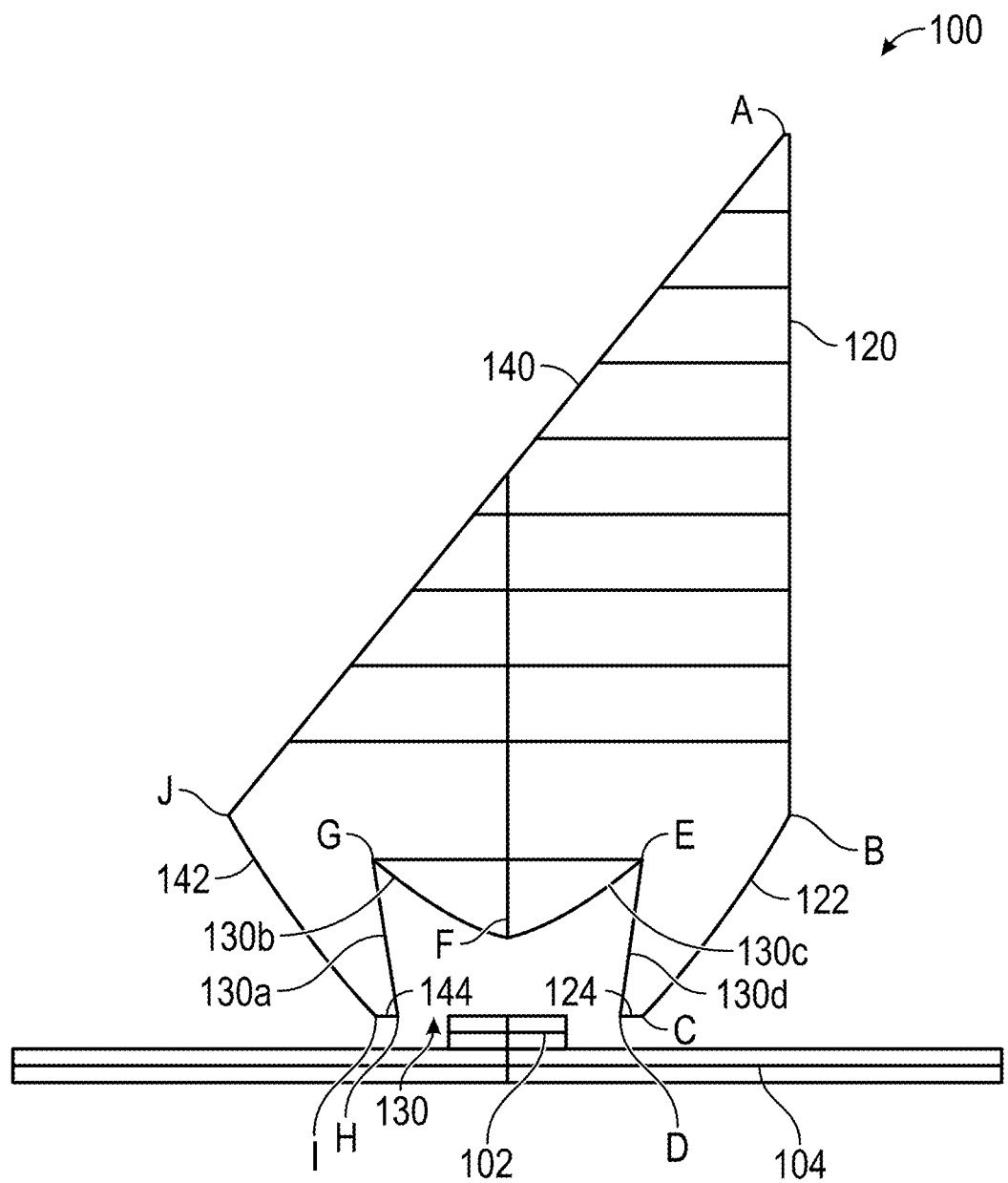
FIG. 1 depicts a cross section of a portion of a luminaire including an asymmetric total internal reflection ("TIR") lens and a row of LED elements in accordance with the present disclosure.

For purpose of illustration, and not limitation, FIG. 1 depicts a schematic of a cross section of an asymmetric TIR lens 100 in accordance with the disclosure. As depicted, the asymmetric TIR lens 100 typically includes a solid, elongate body formed at least in part of light transmissive material, such as a polymer or glass material. As illustrated, the elongate body can be defined at least in part by a first elongate planar surface 120 and a second elongate planar surface 140 spaced from the first planar surface, wherein the first and second elongate planar surfaces cooperate to define at least a portion of the volume of the asymmetric TIR lens. The first elongate planar surface 120 and the second elongate planar surface 140 are illustrated as being joined at an upper end by a first elongate peripheral edge A (see also FIG. 2B) that also acts as an apex point in the cross section of FIG. 1, wherein an angle between surfaces 120, 140 can be an acute angle, for example, as measured through the body of the lens.

The cross-sectional shape of the lens element 100 is further defined by a first lower side facet or surface 142 that joins the second elongate planar surface at apex or edge J, wherein the angle between surfaces 140, 142 an be obtuse, for example, as measured through the body of the lens. Similarly, first planar elongate surface 120 descends to an apex or edge B that adjoins a second lower side facet or surface 122, wherein the angle between surfaces 120, 122 can similarly be obtuse, for example, as measured through the body of the lens.

The lower surface of the lens 100 can be defined by a first lower planar surface 124 that is strip-shaped and adjoins surface 122 at apex or edge C, and a second lower planar surface 144 that is also strip shaped and adjoins surface 142 at apex or edge I.

Edges H and D cooperate to define a linear opening, or groove 130 formed into the bottom of the lens element 100. The groove is defined in FIG. 1 by a first surface, or facet, 130*a* that adjoins surface 144 at edge or apex H. The angle formed between surfaces 144 and 130*a* in the cross section of FIG. 1 can be acute, as measured through the body of the lens. Surface 130*b* meets surface 130*a* along edge or apex G, wherein the angle between the surfaces outside the lens can be acute, and can be obtuse through the body of the lens. Surfaces 130*b*, 130*c* meet at edge or apex F, wherein the angle between surfaces 130*b*, 130*c* is obtuse. Notably, surfaces 130*b*, 130*c* have outwardly bowed surfaces in the cross-section of FIG. 1 to help efficiently direct light within the body of the lens. Surface 130*d* adjoins surface 130*c* along edge or facet E, wherein the angle between surfaces 130*d* and 130*c* is acute measured outside the body of the lens, and obtuse inside the body of the lens. Surface 130*d* meets surface 124 along apex or edge D, wherein the angle between surfaces 130*d* and 124 can be acute as measured through the body of the lens.

The surfaces of the cavity 130 are aligned with light source, such as a LED strip 102 including a row of LED elements (extending into the page of FIG. 1) that can direct light directly into the surfaces 130*a*, 130*b*, 130*c*, 130*d* defining the cavity or groove 130 to facilitate total internal reflection of the light out of the first elongate planar surface 120 of the lens 100. LEDs can be mounted on a LED printed circuit board 104 that can be connected to a power supply to illuminate the LEDs.

Figures 2A, 2B:
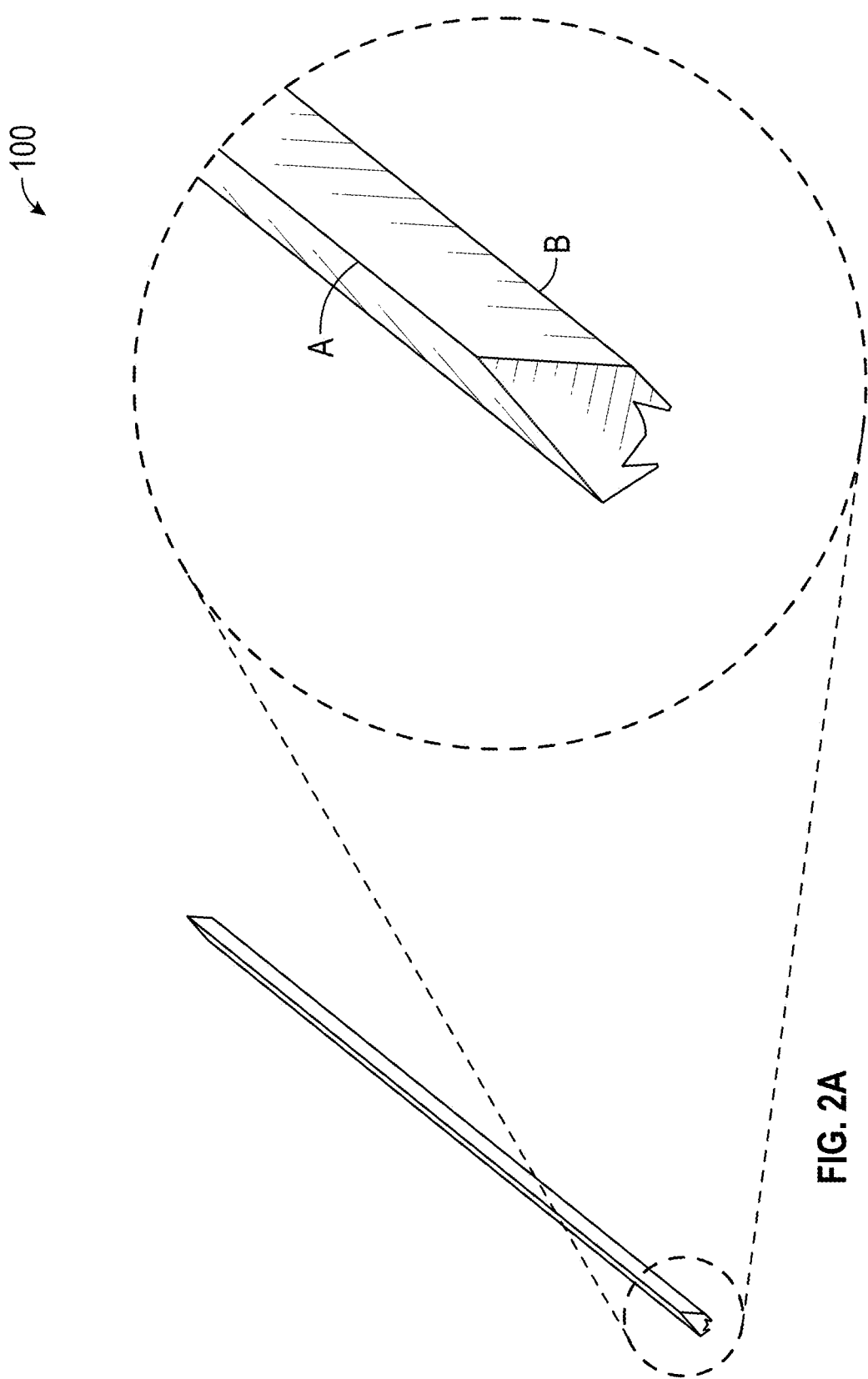
FIG. 2A is an elongate lens element in accordance with the present disclosure according to the design of FIG. 1.
FIG. 2B is a close up view of an end of the elongate lens element of FIG. 2A.

FIG. 2A depicts an isometric rendering of lens element 100 having a cross section matching that of FIG. 1. Visible are edges A, and B. FIG. 2B is an enlarged end view of FIG. 2A to further illustrate the shape of the end of the lens element 100.

Figure 3:
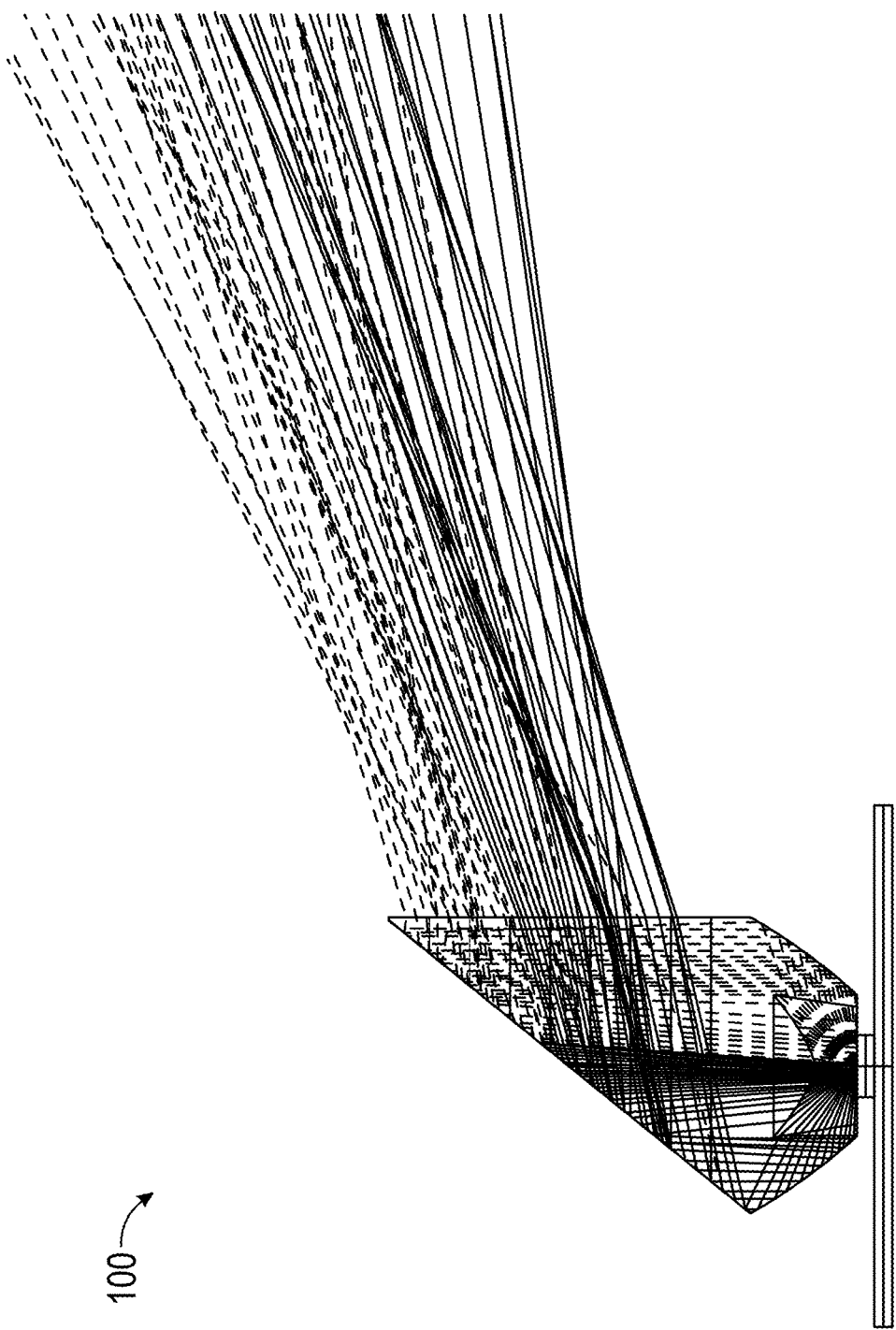
FIG. 3 depicts a computed light distribution plot of the TIR lens illustrated in FIG. 1 and as illustrated in FIGS. 2A and 2B.

With continuing reference to FIG. 3, a computer-generated ray diagram is provided based on the way light can be expected to propagate through the illustrated geometry of TIR lens 100. This illustrates the manner in which the light emitted by the LEDs passes through surfaces 130*a*-130*d* of the groove, and then internally reflects off of surfaces 124, 144, 122, 142, and 140 to be projected neatly out through surface 120. This design, being an actual TIR lens, requires no films or coatings on the internal reflective surfaces, but instead leverages the physics of total internal reflection. Thus, lens element 100 can be extruded in any desired length from any desired light transmissive material, and be used after being molded without further operations to affect the optical properties of the lens. shows the propagation of light through the asymmetric TIR lens when introduced into edge 30.

If desired, the first elongate planar surface 120 can include an interrupted surface such as longitudinal grooves or facets formed into the lens to further disperse the light passing through surface 120, but this is not necessary. Such an interrupted surface can be defined by a plurality of parallel ridges oriented parallel to a longitudinal axis of the asymmetric TIR lens. If desired, the elongate body can be linear and/or curved, and can be loop-shaped, if desired.

Figure 4:
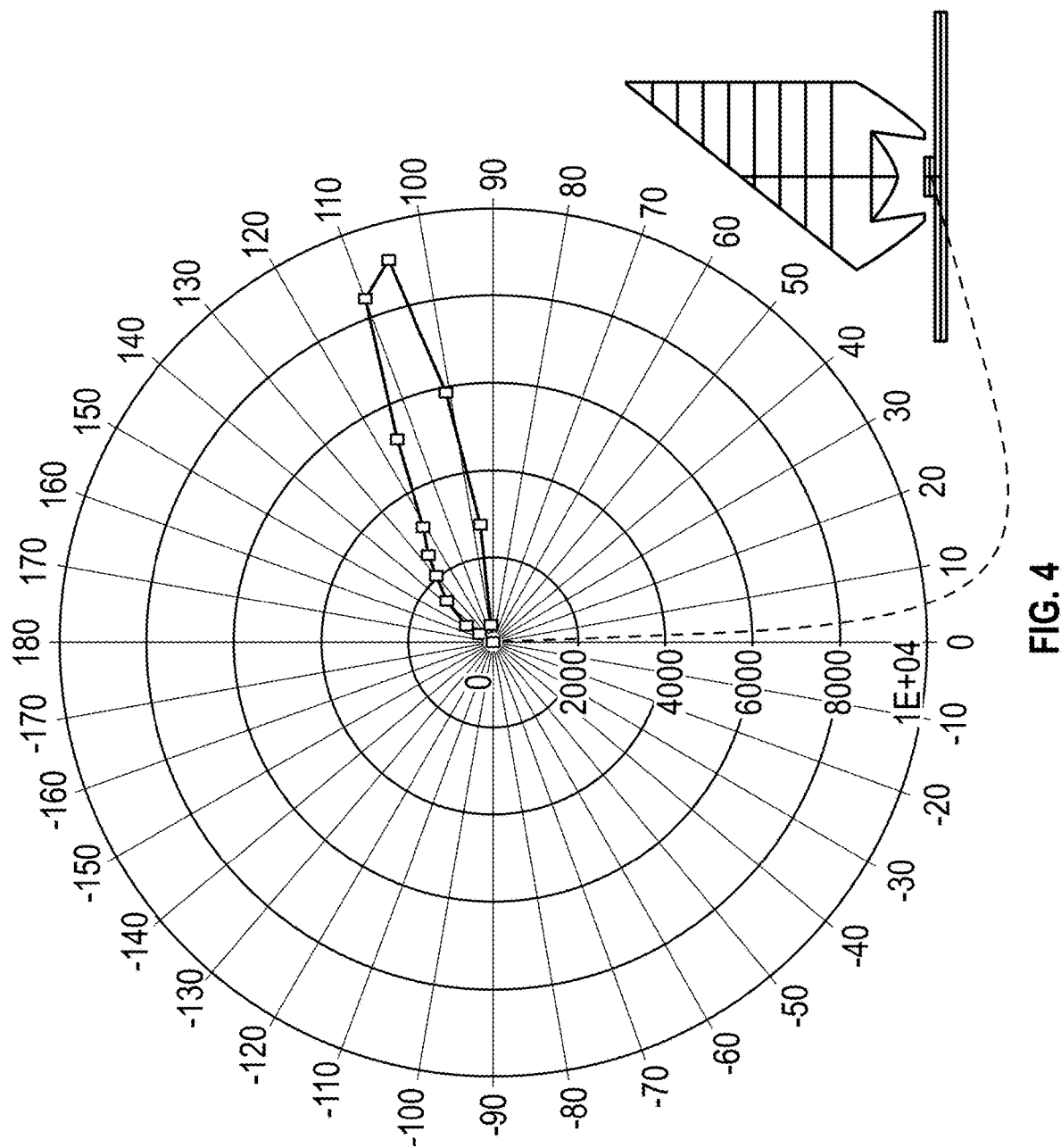
FIG. 4 is a computed polar light output plot of the lens element of FIG. 1, wherein the orientation of the lens element is the same as in FIG. 3 to produce light rays along the direction described by the enclosed integrated polygon in FIG. 4.

FIG. 4 presents a polar light integration plot showing the integration of the light as illustrated in FIG. 3. Notably, the light output is integrated and aimed into a narrow band that can be used advantageously for direct or indirect lighting, in the form of wall wash fixtures, ceiling wash fixtures, and the like.

Figure 5:
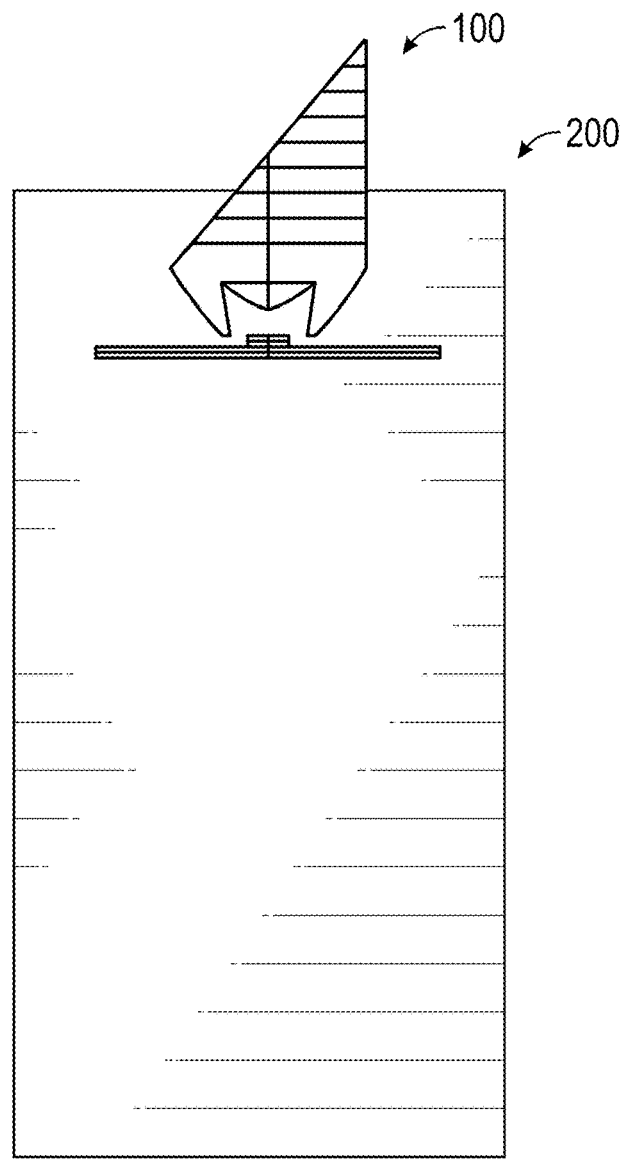
FIG. 5 depicts a cross sectional view of an external housing to house the lens and LED strop depicted in FIG. 1 to provide a complete luminaire.
Figure 6:
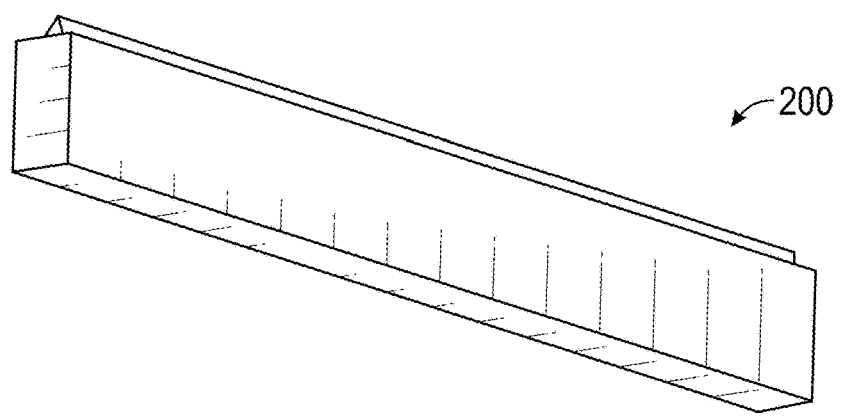
FIG. 6 depicts an isometric view of a luminaire including the asymmetric TIR lens of FIG. 1 in accordance with the present disclosure.

With reference to FIGS. 5 and 6, the disclosure further provides a lighting system, such as a luminaire 200, that in turn includes at least one asymmetric TIR lens (100) as disclosed herein, and a linear light source (102, 104) aligned toward the lower surface of the lens 100. Light generated by the linear light source passes through the surfaces defining the cavity 130 and redirected as illustrated in FIG. 3, out through surface 120. If desired, the linear light source can include a row of LED elements 120, and/or may include a light transmissive medium such as a fiber optic, or other light source, as desired. Such a lighting fixture can be used in a "wall wash" or ceiling wash application to illuminate a wall or ceiling.

As depicted in FIG. 2A, the illustrated TIR lens 100 can be linear in shape, but it will be appreciated that the disclosure includes modifications to this device. For example, rather than being a straight lens that lays along a straight, linear LED light source, the lens can be wavy or curved, for example to match a predetermined radius for placement along a curved wall. In some implementations, the lighting system can be configured as a wall wash fixture or other fixture. The lighting system can be straight, wave shaped, loop shaped, and the like, as desired. The lens or may also be curved to surround a volume and be annularly shaped, for example, ovoid, triangular, serpentine, and the like so as to direct light radially outwardly or inwardly, depending on the geometry. The LED strip or other light source can accordingly be shaped to be ring shaped, or curved, or serpentine shaped to follow the shape of the lens.

The present disclosure further discloses methods of manufacturing an asymmetric TIR lens as set forth herein, and optionally, a lighting system including the asymmetric TIR lens. The TIR lens can be formed by injection molding, for example, or extrusion, if desired. If desired, the light transmissive material can be polymeric or glass, as desired.

The disclosure further provides implementations of methods for installing a light fixture, including providing a lighting system as set forth herein, and installing the lighting system in an orientation wherein the first elongate planar surface 120 is oriented toward a wall, ceiling, or other region of interest to be illuminated. The second elongate planar surface 140 can accordingly be oriented toward a location where an intended observer of the wall illumination is to be located so that the intended observer is unable to discern that light from the fixture is originating from the first elongate planar surface 120.

The lens can be made on a very small dimension, if desired, and can be made from material that is rigid, or flexible. For example, the illustrated lens can be 15 mm wide (but any suitable dimension can be used), permitting it to be fitted into a very tight space. The design can be extruded from polymeric material or glass to permit the illustrated under-cut in the geometry. This lens can be suitable in an application for a slim look uplight, a wall wash, a ceiling wash, or other application.

The devices and methods disclosed herein can be used for other purposes as illustrated or can be modified as needed to suit the particular application. In view of the many possible embodiments to which the principles of this disclosure may be applied, it should be recognized that the illustrated embodiments are only preferred examples of the disclosure and should not be taken as limiting the scope of the disclosure.

What is claimed is:

1. A luminaire comprising:
a linear light source including a row of LED elements; and
an asymmetric total internal reflection ("TIR") lens comprising an elongate body formed at least in part of light transmissive material, wherein:
the elongate body is defined by a first elongate planar surface and a second elongate planar surface, the second elongate planar surface being spaced from the first elongate planar surface, and the first and second elongate planar surfaces at least partially define a volume of the asymmetric TIR lens;
the elongate body is further defined by a plurality of adjacent parallel facets that cooperate to define a channel along a further edge of the elongate body
the row of LED elements is configured to direct light through the plurality of adjacent parallel facets defining the channel into the TIR lens
the lens is configured to internally reflect light entering the TIR lens through each facet of the plurality of adjacent parallel facets to create a plurality of beams, each beam in the plurality of beams corresponding to the total light entering through each respective facet, each said beam in the plurality of beams being internally reflected with the TIR lens and exiting the TIR lens through the first elongate planar surface; and
each said beam in the plurality of beams, after having exited the first elongate planar surface does not form a projection that fully overlaps with any other beam in the plurality of beams onto a surface that is spaced away and parallel to the first elongate planar surface.

2. The luminaire of claim 1, wherein the elongate body is linear.

3. The luminaire of claim 1, wherein the elongate body is curved.

4. The luminaire of claim 1, wherein the luminaire is a ceiling wash fixture.

5. The luminaire of claim 1, wherein the luminaire is a wall wash fixture.

6. The luminaire of claim 1, wherein the channel is formed from four adjacent parallel facets.

7. The luminaire of claim 6, wherein first and second sides of the channel are formed from flat, planar facets, and a top of the channel is formed from a plurality of adjacent, convex facets that adjoin the flat planar facets forming the first and second sides of the channel.

8. The luminaire of claim 7, wherein the first and second sides of the channel are angled such that an elongate opening to the channel is narrower than width compared to a location in the channel located inwardly with respect to the elongate opening to the channel.

9. An asymmetric total internal reflection ("TIR") lens comprising an elongate body formed at least in part of light transmissive material, wherein:
the elongate body is defined by a first elongate planar surface and a second elongate planar surface, the second elongate planar surface being spaced from the first elongate planar surface, wherein the first and second elongate planar surfaces at least partially define a volume of the asymmetric TIR lens; and
wherein the elongate body is further defined by a plurality of surfaces that define a channel along a further edge of the elongate body, wherein the lens is configured to internally reflect light passing through the plurality of surfaces that define the channel outwardly and substantially only through the first elongate planar surface to form a plurality of overlapping beams that substantially uniformly illuminate a surface oriented perpendicularly with respect to the first elongate planar surface along at a plurality of different distances from the elongate body.

10. The TIR lens of claim 9, wherein the channel is formed from a plurality of adjacent parallel facets.

11. The TIR lens of claim 10, wherein first and second sides of the channel are formed from flat, planar facets, and a top of the channel is formed from at least one convex facet that adjoins the flat planar facets forming the first and second sides of the channel.

12. The TIR lens of claim 11, wherein the first and second sides of the channel are angled such that an elongate opening to the channel is narrower than width compared to a location in the channel located inwardly with respect to the elongate opening to the channel.

13. A luminaire comprising:
a linear light source including a row of LED elements; and
the TIR lens of claim 9, wherein the row of LED elements is configured to direct light through the plurality of surfaces that define the channel.

14. An asymmetric total internal reflection ("TIR") collimator lens comprising an elongate body formed at least in part of light transmissive material, wherein:
the elongate body is defined by a first elongate planar surface and a second elongate planar surface, the second elongate planar surface being spaced from the first elongate planar surface, wherein the first and second elongate planar surfaces at least partially define a volume of the asymmetric TIR lens; and
wherein the elongate body is further defined by a plurality of surfaces that define a channel along a further edge of the elongate body, and wherein the lens is configured to internally reflect substantially all of the light originating from a light source and passing through the plurality of surfaces that define the channel outwardly through the first elongate planar surface in the form of a substantially evenly-distributed collimated beam that is substantially fully contained within a solid angle of projection that is oriented between about 90 and about 140 degrees from nadir with respect to the light source in polar coordinates.

15. The asymmetric TIR collimator lens of claim 14, wherein the channel is formed from a plurality of adjacent parallel facets.

16. The asymmetric TIR collimator lens of claim 15, wherein first and second sides of the channel are formed from flat, planar facets, and a top of the channel is formed from at least one convex facet that adjoins the flat planar facets forming the first and second sides of the channel.

17. The asymmetric TIR collimator lens of claim 16, wherein the first and second sides of the channel are angled such that an elongate opening to the channel is narrower than width compared to a location in the channel located inwardly with respect to the elongate opening to the channel.

18. A luminaire comprising:
a linear light source including a row of LED elements; and
the TIR collimator lens of claim 14, wherein the row of LED elements is configured to direct light through the plurality of surfaces that define the channel.

* * * * *